(12) United States Patent
Hosokawa et al.

(10) Patent No.: US 7,592,078 B2
(45) Date of Patent: Sep. 22, 2009

(54) TRANSPARENT COATING FILMS

(75) Inventors: Hiroji Hosokawa, Wakayama (JP); Kouji Kinuta, Wakayama (JP)

(73) Assignee: KAO Corporation, Tokyo (JP)

( * ) Notice: Subject to any disclaimer, the term of this patent is extended or adjusted under 35 U.S.C. 154(b) by 362 days.

(21) Appl. No.: 11/398,565

(22) Filed: Apr. 6, 2006

(65) Prior Publication Data

US 2007/0003699 A1    Jan. 4, 2007

(30) Foreign Application Priority Data

Apr. 7, 2005   (JP) ............................. 2005-111458

(51) Int. Cl.
*B32B 18/00*   (2006.01)
*B05D 3/02*   (2006.01)

(52) U.S. Cl. ................. 428/702; 427/376.2; 427/372.2; 427/376.6; 106/1.05; 428/701

(58) Field of Classification Search ........................ None
See application file for complete search history.

(56) References Cited

U.S. PATENT DOCUMENTS 6,524,664 B1    2/2003   Hashimoto et al.

2003/0203980 A1    10/2003   Valdes

OTHER PUBLICATIONS

Ohya et al., Chem. Mater, vol. 14, pp. 3082-3089. (2002).
Ohya et al., Bull. Chem. Soc. Jpn., vol. 76, pp. 429-435. (2003).

*Primary Examiner*—John J. Zimmerman
*Assistant Examiner*—Aaron Austin
(74) *Attorney, Agent, or Firm*—Birch, Stewart, Kolasch & Birch, LLP

(57) ABSTRACT

The present invention relates to (1) a transparent coating film containing a layered titanate containing an organic cation derived from amines having a boiling point of 300° C. or lower as measured under an ambient pressure, and having an atomic ratio of nitrogen to titanium of 0.01 to 0.3; and (2) a process for producing a transparent coating film having an atomic ratio of nitrogen to titanium of 0.01 to 0.3, containing the steps of applying a solution containing an organic cation derived from amines having a boiling point of 300° C. or lower as measured under an ambient pressure, and a layered titanate onto a substrate; and heat-treating the thus applied solution at a temperature less than 450°C. The coating film exhibits a high hardness, an excellent transparency, a low photocatalytic activity and an excellent stability as well as a good adhesion property to a substrate.

7 Claims, No Drawings

TRANSPARENT COATING FILMS

FIELD OF THE INVENTION

The present invention relates to transparent coating films and a process for producing the transparent coating films.

BACKGROUND OF THE INVENTION

Titanium oxide-containing films exhibit various functions such as UV-cutting property, self-cleanability, ultra-hydrophilic (anti-fogging) property, anti-reflecting property, heat resistance (flame retardant), abrasion resistance, electrical insulating property and dielectric characteristics, and have therefore been intended to be used in various applications.

In general, titanium oxides conventionally used are of either an anatase type or a rutile type, i.e., titania, and have been used to prepare a coating material in the form of a dispersion of titania having a particle size of from 10 nm to several hundreds nm. In addition, a titania precursor obtained by hydrolysis of a titanium alkoxide is baked on a substrate to form a titania-containing coating film thereon.

Further, there have been reported coating films containing not conventional titania of either an anatase type or a rutile type but titanates (for example, refer to T. Ohya, A. Nakayama, T. Ban, Y. Ohya and Y. Takahashi, "Bull. Chem. Soc. Jpn", Vol. 76, p. 429 (2003)). According to this report, a glass substrate is spin-coated or dip-coated with a transparent aqueous solution obtained by reacting an organic cation such as tetramethyl ammonium hydroxide and diethanol amine with titanium tetraisopropoxide to form a relatively transparent titanate-containing coating film.

SUMMARY OF THE INVENTION

The present invention relates to:

(1) A transparent coating film containing a layered titanate containing an organic cation derived from amines having a boiling point of 300° C. or lower as measured under an ambient pressure (a normal pressure), and having an atomic ratio of nitrogen to titanium of 0.01 to 0.3; and (2) a process for producing a transparent coating film having an atomic ratio of nitrogen to titanium of 0.01 to 0.3, containing the steps of applying a solution containing an organic cation derived from amines having a boiling point of 300° C. or lower as measured under an ambient pressure (a normal pressure), and a layered titanate onto a substrate; and heat-treating the thus applied solution at a temperature less than 450° C.

DETAILED DESCRIPTION OF THE INVENTION

Any of the above conventional film-forming methods fails to produce a transparent coating film having an excellent hardness identical to or higher than that of the substrate. For this reason, there has been such a demand for providing a transparent coating film having an excellent transparency and a high hardness.

The present invention relates to transparent coating films capable of exhibiting both a high hardness and a high transparency, as well as a process for producing the transparent coating films with a high efficiency.

The present inventors have found that transparent coating films containing a layered titanate and having a specific atomic ratio of nitrogen to titanium or lower can exhibit both a high hardness and a high transparency, and can be efficiently produced by applying a solution containing an organic cation derived from specific amines and the layered titanate onto a substrate and heat-treating the thus applied solution at a specific temperature or lower.

(Transparent Coating Film)

The transparent coating film of the present invention contains a layered titanate containing an organic cation derived from amines having a boiling point of 300° C. or lower as measured under an ambient pressure, and has an atomic ratio of nitrogen to titanium of 0.01 to 0.3. The transparent coating film having an atomic ratio of nitrogen to titanium of 0.01 to 0.3 exhibits a high hardness. The atomic ratio of nitrogen to titanium of the transparent coating film is preferably 0.01 to 0.25 and more preferably 0.05 to 0.24. Meanwhile, the atomic ratio of nitrogen to titanium of the transparent coating film may be determined from quantitative determination of titanium by a fluorescent X-ray method and quantitative determination of nitrogen using a fully-automatic elemental analyzer.

The transparent coating film of the present invention exhibits a haze of usually 0 to 5%, preferably 0 to 2%, more preferably 0 to 1% and most preferably 0 to 0.5% in view of a good transparency of the film. The haze value of the transparent coating film may be measured by a haze meter, etc.

The coating film obtained according to the production process of the present invention when formed on a substrate having a sufficiently high hardness, exhibits a pencil hardness of 6H or higher, preferably 7H or higher and more preferably 9H as measured by a pencil hardness testing method according to JIS K-5400.

The thickness of the transparent coating film may be measured by direct observation using an electron microscope, or by an optical thickness meter such as ellipsometer or a probe-type thickness meter. The thickness of the transparent coating film is preferably 10 μm or less, more preferably 5 μm or less, still more preferably 3 μm or less and most preferably 1 μm or less in view of a good transparency of the film. Whereas, the thickness of the transparent coating film is preferably 10 nm or more, more preferably 20 nm or more, still more preferably 50 nm or more and most preferably 100 nm or more in view of a good hardness of the film.

Meanwhile, in ultraviolet absorption spectrum of the transparent coating film of the present invention, a rise-up wavelength (absorption edge) of the absorption spectrum is observed in the range of from 300 to 340 nm. Whereas, in ultraviolet absorption spectrum of anatase-type titania, a rise-up wavelength thereof is observed in the range of from 360 to 380 nm, and in ultraviolet absorption spectrum of rutile-type titania, a rise-up wavelength thereof is observed in the range of from 400 to 420 nm.

In general, anatase-type or rutile-type titania exhibits a photocatalytic activity, and therefore has such a problem that organic compounds contained in the coating solution or resultant film are decomposed or the substrate is deteriorated owing to the photocatalytic activity. On the other hand, since the ultraviolet absorption edge of the layered titanate containing an organic cation according to the present invention appears on a shorter wavelength side as compared to that of the anatase-type or rutile-type titania, the layered titanate exhibits a less absorption of ultraviolet rays (such as UV-A and UV-B), i.e., a lower photocatalytic activity. As a result, the use of the layered titanate enables production of a more suitable transparent coating film as compared to the anatase-type or rutile-type titania in view of good stability (light resistance) of the organic compounds or the film.

(Layered Titanate)

The layered titanate exhibits such a Raman spectrum in which signals thereof are observed in regions of from 260 to 305 cm$^{-1}$, from 440 to 490 cm$^{-1}$ and from 650 to 1000 cm$^{-1}$. On the other hand, the anatase-type titania exhibits such a Raman spectrum in which Raman peaks thereof are observed in regions of from 140 to 160 cm$^{-1}$, from 390 to 410 cm$^{-1}$, 510 to 520 cm$^{-1}$ and from 630 to 650 cm$^{-1}$, and the rutile-type titania exhibits such a Raman spectrum in which Raman peaks thereof are observed in regions of from 230 to 250 cm$^{-1}$, from 440 to 460 cm$^{-1}$ and from 600 to 620 cm$^{-1}$.

The layered titanate is considered to have such a structure in which octahedral basic units each composed of six oxygen atoms coordinated to a central titanium atom, are arranged in plane. Specific examples of the layered titanate include dititanate, trititanate, tetratitanate, pentatitanate, hexatitanate and other titanates having a lepidocrocite-type structure, etc.

The layered titanate may be produced by (i) the method of mixing an aqueous solution of amines with a titanium source, and (ii) the method of mixing amines with a titanium source and then adding water to the obtained mixture for hydrolysis thereof.

(Amines)

In the process of the present invention, as the amines, there may be used those amines having a boiling point of 300° C. or lower and preferably from 20 to 100° C. as measured under an ambient pressure. The amines having a low boiling point such as 300° C. or lower are removed by vaporization at a low temperature without decomposition thereof, thereby enabling production of an extremely excellent transparent coating film even by low-temperature treatments.

Examples of the preferred amines include alkyl amines or alkenyl amines, and these amines are preferably in the form of either a primary amine, a secondary amine or a tertiary amine. When quaternary ammonium salts are used as the amines, the resultant coating film tends to be insufficient in hardness and transparency.

Among these alkyl amines and alkenyl amines, preferred are those having 1 to 20 carbon atoms, and more preferred are those having 1 to 10 carbon atoms. Also, these amines may be in the form of a monoamine or a polyamine.

Specific examples of the alkyl amines and the alkenyl amines include primary amines such as methylamine, ethylamine, n-propylamine, n-butylamine, n-pentylamine, n-hexylamine, n-heptylamine, n-octylamine, n-nonylamine, n-decylamine and allylamine; secondary amines such as dimethylamine, diethylamine, di-n-propylamine, di-n-butylamine, diallylamine, azetidine, pyrrolidine, piperidine and piperadine; tertiary amines such as trimethylamine, triethylamine, tri-n-propylamine and tri-n-butylamine; diamines such as ethylenediamine, 1,2-propanediamine, 1,3-propanediamine, 1,2-butanediamine, 1,3-butanediamine, 1,4-butanediamine, 1,2-pentanediamine, 1,3-pentanediamine, 1,4-pentanediamine, 1,5-pentanediamine, 2,3-pentanediamine, 1,2-hexanediamine, 1,3-hexanediamine, 1,4-hexanediamine, 1,5-hexanediamine, 1,6-hexanediamine, 1,7-heptanediamine and 1,8-octanediamine; and alkenyl amines such as butenyl amine, hexenyl amine, octenyl amine and decenyl amine. These amines may be used alone or in combination of any two or more thereof.

Among these amines, in view of low costs and good hardness of the resultant film, preferred are secondary alkyl amines such as dimethylamine, diethylamine and di-n-propylamine, and tertiary alkyl amines such as triethylamine; more preferred is secondary alkyl amines having 1 to 10 carbon atoms; still more preferred are diethylamine and di-n-propylamine; and most preferred is diethylamine.

(Titanium Source)

Examples of the titanium source include titanium alkoxides and titanium hydroxide.

Specific examples of the titanium alkoxides include titanium tetraethoxide, titanium tetraisopropoxide and titanium tetrabutoxide. These titanium alkoxides may be used alone or in the form of a mixture of any two or more thereof. Among these titanium alkoxides, in view of general availability and good handling property, preferred is titanium tetraisopropoxide.

The titanium hydroxide may be produced by hydrolyzing a titanium salt such as titanium chloride, e.g., titanium tetrachloride, titanium trichloride and titanium dichloride, titanium sulfate, titanyl sulfate and titanyl nitrate, with alkali. The alkali is preferably ammonia.

(Process for Producing Transparent Coating Film)

The process for producing the transparent coating film of the present invention is not particularly limited. The aimed transparent coating film is preferably produced by the process as defined in the present invention, i.e., by applying a solution containing an organic cation derived from amines having a boiling point of 300° C. or lower as measured under an ambient pressure, and a layered titanate (hereinafter referred to merely as a "transparent coating solution") onto a substrate; and heat-treating the thus applied transparent coating solution at a temperature less than 450° C.

(Transparent Coating Solution)

The transparent coating solution containing the organic cation and the layered titanate may be prepared, for example, by hydrolyzing the titanium source in the presence of the amines as described in the above methods (i) and (ii).

The concentration of the titanate in the transparent coating solution (concentration in terms of mass of TiO$_2$) is preferably 40% or lower, more preferably 20% or lower and still more preferably 10% or lower in view of a good storage stability of the transparent coating solution, and is preferably 0.1% or higher, more preferably 1% or higher and still more preferably 2% or higher in view of high film-forming efficiency and properties of the resultant film.

The transparent coating solution may also contain titanium species other than titanate, such as titanium alkoxides, e.g., titanium tetraisopropoxide, etc., anatase-type titania and rutile-type titania. However, in such a case, in view of good storage stability of the transparent coating solution and properties of the resultant film, the concentration of the titanium species other than titanate is preferably limited to 50% or lower, more preferably 20% or lower, still more preferably 10% or lower and most preferably 0%. The titanium species in the transparent coating solution may be identified and quantitatively determined from Raman spectrum thereof similarly to the layered titanate.

The concentration of the organic cation in the transparent coating solution is controlled such that an atomic ratio of nitrogen to titanium in the solution is preferably 0.01 to 10, more preferably 0.1 to 2, still more preferably 0.2 to 1.5 and most preferably 0.8 to 1.2, in view of good structural stability of the layered titanate in the transparent coating solution and low costs. In addition, the pH of the transparent coating solution as measured at 25° C. is preferably 3 to 13 and more preferably 6 to 12 in view of flexibility of the transparent coating solution and good structural stability of the layered titanate in the transparent coating solution.

The solvent for the transparent coating solution is not particularly limited, and examples of the suitable solvent include water, an organic solvent and a mixed solvent thereof. The boiling point of the organic solvent usable in the transparent coating solution is preferably 20 to 300° C., more preferably 30 to 200° C. and still more preferably 30 to 130° C. in view of good film-forming efficiency.

Specific examples of the usable organic solvent include oxygen-containing organic solvents such as alcohols, e.g., methyl alcohol, ethyl alcohol, isopropyl alcohol and butyl alcohol, acetone, tetrahydrofuran and propylene carbonate; nitrogen-containing organic solvents such as acetonitrile; and the above amines.

The transparent coating solution may further contain additional components other than the layered titanate, other titanium species, the organic cation and the solvent, unless the use thereof adversely affect properties of the transparent coating solution and the resultant transparent coating film.

(Substrate)

The substrate on which the transparent coating film of the present invention is to be formed, is not particularly limited. Examples of materials of the suitable substrate include glass, metals, ceramic materials, plastic materials, papers and fibers. Among these materials, in view of facilitated production of the aimed film and good transparency and hardness of the resultant film, those materials exhibiting a less deformation when exposed to externally applied forces and heat, are preferable. That is, the preferred materials for the substrate are glass, metals, ceramic materials and plastic materials, and more preferred are glass, metals and ceramic materials.

The adhesion property (bonding property) of the transparent coating film to the substrate may be determined by a cross cut (X-cut) tape method according to JIS K-5400, etc., and is preferably 2 to 10, more preferably 8 to 10 and most preferably 10 as measured and evaluated by the X-cut tape method.

(Coating)

The method of coating the substrate with the transparent coating solution is not particularly limited. The transparent coating solution may be applied onto the substrate by ordinary methods such as spin-coating, dip-coating and spray-coating. Among these methods, in view of good film-forming efficiency and good uniformity of the resultant film, preferred are the spin-coating method and the dip-coating method.

(Heat Treatment)

The coating film thus formed on the substrate is subjected to heat treatment such as drying and baking to produce a transparent coating film having a high hardness.

The heat treatment is preferably conducted at a temperature not less than a boiling point of the organic cation or solvent, in view of facilitated removal of residual organic substances and good hardness of the resultant film. Further, since thermal decomposition of the organic cation tends to generate carbonaceous residues and therefore cause undesirable discoloration or deterioration in transparency, the heat-treating temperature is preferably below a decomposition temperature of the organic cation. Further, in view of structural stability of the layered titanate and prevention of its phase transfer into titania, the heat-treating temperature is preferably less than 450° C., more preferably 350° C. or lower and still more preferably 80 to 250° C.

The heat-treating time varies depending upon the heat-treating temperature and therefore is not particularly limited. In view of facilitated removal of residual organic substances and good hardness of the resultant film, the heat-treating time is preferably 15 min or longer, more preferably 20 min or longer and still more preferably 30 min or longer, whereas in view of good film-forming efficiency, the heat-treating time is 24 h or shorter, more preferably 12 h or shorter and still more preferably 5 h or shorter.

EXAMPLES

Various properties and characteristics of the coating films obtained in the following Examples and Comparative Examples were measured and evaluated by the following methods.

(1) Measurement of Film Thickness

The thickness of the film was measured using a probe-type thickness meter "SURFCOM 1500DX" available from Tokyo Seimitsu Co., Ltd., under the following conditions:

Standard for calculation of parameters: JIS-01; Measurement mode: roughness measurement; Cutoff mode: Gaussian; Gradient correction: first half Scanning distance: 20 mm; Scanning speed: 0.3 mm/s; Reference height: 0.1 µm; Deletion length: 500 µm The measurement of average height (AVH) was made at five positions of each thin film, and an average value of the five measured average height values was determined as the thickness of the film.

(2) Identification of Ti Skeletal Structure

The Ti skeletal structure was identified from a Raman Spectrum thereof. The Raman spectrum was measured using an Ar ion laser having a wavelength of 488 nm as a light source and a CCD camera as a detector to obtain 5154 data in a wavelength region of from 100 to 1100 $cm^{-1}$. The measurement was conducted by a reflection method at a laser output power of 100 to 400 mW for a cumulative period of 30 to 300 s.

(3) Analysis of Composition

The analysis of composition of the film was conducted as follows. That is, the quantitative determination of Ti in the film was made using a fluorescent X-ray analyzer "ZSX100E" available from Rigaku Denki Co., Ltd., whereas the quantitative determination of C, H and N in the film was made using a fully-automatic elemental analyzer "2400II" (column separation type; TCD detection) available from Perkin-Elmer Inc.

(4) Absorption Edge

The absorption edge of the film was determined from an absorption spectrum measured using an ultraviolet-visible ray spectrophotometer "U-3300" available from Hitachi Limited.

(5) Transparency

The transparency of the film was evaluated from a haze value (%) thereof measured using a haze meter (a reflectance/transmittance meter "HR-100" available from Murakami Sikizai Kenkyusho Co., Ltd.).

(6) Adhesion Property

The adhesion property (bonding property) of the film to the substrate was evaluated by a cross-cut (X-cut) tape method according to JIS K-5400.

(7) Pencil Hardness

The hardness of the thin film was evaluated by a pencil hardness testing method according to JIS K-5400.

(8) Photocatalytic Activity

Thirty milliliters of a 5 ppm rhodamine B pigment aqueous solution and the film were placed in a glass container, and irradiated with light from a xenon lamp "SUNTEST CPS+"

available from Helaus Co., Ltd., for 2 h at an illumination intensity of 500 W/m². The rate (%) of decomposition of the rhodamine B pigment was calculated from the change in absorbance of the rhodamine B pigment aqueous solution between before and after the light irradiation.

Meanwhile, it was confirmed that the decomposition rate of a control sample composed of the rhodamine B pigment aqueous solution solely without adding the film thereto was 6% (as a blank value) after irradiating light thereto for 2 h using a xenon lamp. As a result, the photocatalytic activity of each coating film was determined as the value obtained by subtracting the blank value from the respective measured values.

Example 1

Into a solution prepared by dissolving 7.3 g of diethylamine (available from Wako Junyaku Kogyo Co., Ltd.; boiling point: 55° C.) in 160 g of water was slowly dropped 28.4 g of titanium tetraisopropoxide available from Wako Junyaku Kogyo Co., Ltd. The resultant mixture was stirred at room temperature for one day to synthesize a transparent coating solution containing a layered titanate. A slide glass substrate available from Matsunami Co., Ltd., having a size of 76 mm×26 mm and a thickness of 1.2 to 1.5 mm was cleaned with acetone to remove oils and dirt therefrom, and was fixed at opposite ends thereof with a tape. Then, the transparent coating solution was applied onto the thus fixed glass substrate using a spin coater available from Able Co., Ltd., under the following conditions, thereby forming a coating film thereon:

Amount of the coating solution dropped: 0.2 mL; Dropping time: 10 s; Retention time after dropping: 30 s; Spin speed upon dropping: 0 rpm; Spin acceleration: 100 rpm/s; Spin speed: 100 rpm; Spin time: 30 s; Spin deceleration: 100 rpm/s The thus obtained spin-coating film was heat-treated at 100° C. for 30 min using an electric dryer. The conditions for production of the coating film are shown in Table 1, and results of evaluation of the obtained film are shown in Table 2.

Example 2

The same procedure as in Example 1 was repeated except for heat-treating the film at 200° C. for 30 min (temperature rise time: 3 h; temperature drop time: 1 h) in place of 100° C. for 30 min using an electric oven "SUPER-BURN" available from Motoyama Co., Ltd., thereby obtaining a coating film. The conditions for production of the coating film are shown in Table 1, and results of evaluation of the obtained film are shown in Table 2.

Comparative Example 1

The same procedure as in Example 1 was repeated except for heat-treating the film at 110° C. for 10 min in place of 100° C. for 30 min, thereby obtaining a coating film. The conditions for production of the coating film are shown in Table 1, and results of evaluation of the obtained film are shown in Table 2.

Comparative Example 2

Into a solution prepared by dissolving 18.2 g of tetramethyl ammonium hydroxide (25% aqueous solution available from Wako Junyaku Kogyo Co., Ltd.; decomposition temperature: 310° C.) in 150 g of water was slowly dropped 28.4 g of titanium tetraisopropoxide available from Wako Junyaku Kogyo Co., Ltd. The resultant mixture was stirred at room temperature for one day to synthesize a transparent coating solution containing a layered titanate. The thus prepared transparent coating solution containing the layered titanate was spin-coated and heat-treated in the same manner as in Example 1, thereby obtaining a coating film. The conditions for production of the coating film are shown in Table 1, and results of evaluation of the obtained coating film are shown in Table 2.

Comparative Example 3

The same procedure as in Comparative Example 2 was repeated except for heat-treating the film at 200° C. for 30 min (temperature rise time: 3 h; temperature drop time: 1 h) in place of 100° C. for 30 min using an electric oven "SUPER-BURN" available from Motoyama Co., Ltd., thereby obtaining a coating film. The conditions for production of the coating film are shown in Table 1, and results of evaluation of the obtained film are shown in Table 2.

Comparative Example 4

A commercially available titania sol solution "TIENOCK M-6" available from Taki Chemical Co., Ltd., was spin-coated and heat-treated in the same manner as in Example 1, thereby obtaining a coating film. The conditions for production of the coating film are shown in Table 1, and results of evaluation of the obtained film are shown in Table 2.

TABLE 1-1

| | Coating solution | | |
|---|---|---|---|
| | Ti product name | Kind of organic cation | $TiO_2$ concentration (wt %) |
| Example 1 | Layered titanate | Diethylamine | 4 |
| Example 2 | Layered titanate | Diethylamine | 4 |
| Comparative Example 1 | Layered titanate | Diethylamine | 4 |
| Comparative Example 2 | Layered titanate | Tetramethyl ammonium hydroxide | 6 |
| Comparative Example 3 | Layered titanate | Tetramethyl ammonium hydroxide | 6 |
| Comparative Example 4 | Titania sol "TIENOCK M-6" | | 6 |

TABLE 1-2

| | Coating solution | Drying of coating film | |
|---|---|---|---|
| | Atomic ratio of N to Ti (N/Ti) | Temperature (° C.) | Time (min) |
| Example 1 | 1 | 100 | 30 |
| Example 2 | 1 | 200 | 30 |
| Comparative Example 1 | 1 | 110 | 10 |
| Comparative Example 2 | 2 | 100 | 30 |
| Comparative Example 3 | 2 | 200 | 30 |
| Comparative Example 4 | — | 100 | 30 |

TABLE 2-1

| | Properties of coating film | | | |
|---|---|---|---|---|
| | Ti skeletal structure | Atomic ratio of N to Ti (N/Ti) | Absorption edge (nm) | Film thickness (nm) |
| Example 1 | Layered titanate | 0.23 | 320 | 400 |
| Example 2 | Layered titanate | 0.18 | 320 | 400 |
| Comparative Example 1 | Layered titanate | 0.35 | 320 | 400 |
| Comparative Example 2 | Layered titanate | 0.47 | 320 | 500 |
| Comparative Example 3 | Layered titanate | 0.25 | 320 | 500 |
| Comparative Example 4 | Anatase-type titania | — | 370 | 400 |

TABLE 2-2

| | Properties of coating film | | | |
|---|---|---|---|---|
| | Haze (%) | Adhesion property | Pencil hardness | Photocatalytic activity (%) |
| Example 1 | 0.4 | 10 | 9H | 0 |
| Example 2 | 0.4 | 10 | 9H | 0 |
| Comparative Example 1 | 0.4 | 10 | 6H | 0 |
| Comparative Example 2 | 8.2 | 10 | 6B | 0 |
| Comparative Example 3 | 6.6 | 10 | 3H | 0 |
| Comparative Example 4 | 0.4 | 10 | 2B | 6 |

INDUSTRIAL APPLICABILITY

In accordance with the present invention, there are provided a transparent coating film exhibiting both a high hardness and a high transparency as well as a process for producing the transparent coating film with a high efficiency.

The coating film of the present invention exhibits a high hardness, an excellent transparency, a low photocatalytic activity and an excellent stability as well as a good adhesion property (bonding property) to a substrate, and therefore can be suitably used in extensive applications such as anti-reflecting films, heat-resisting films, abrasion-resisting films, electrically insulating films and dielectric films.

The invention claimed is:

1. A transparent coating film comprising a layered titanate containing an organic cation derived from amines having a boiling point of 300° C. or lower as measured under an ambient pressure, wherein said transparent coating film has an atomic ratio of nitrogen to titanium of 0.01 to 0.3 and exhibits a haze of 0 to 1%, wherein said transparent coating film is made by a process comprising the steps of mixing an aqueous solution of amines having a boiling point of 300° C. or lower as measured under an ambient pressure with a titanium source to produce a layered titanate, applying the solution containing an organic cation derived from said amines and said layered titanate onto a substrate, and heat-treating the thus applied solution at a temperature from 80 to 250° C.

2. The transparent coating film according to claim 1, wherein a pencil hardness pf of the transparent coating film is 7H or higher as measured by a pencil hardness testing method according to JIS K-5400.

3. The transparent coating film according to claim 1 or 2, wherein the amines are secondary alkyl amines having 1 to 10 carbon atoms.

4. A process for producing a transparent coating film having an atomic ratio of nitrogen to titanium of 0.01 to 0.3 and exhibiting a haze of 0 to 1%, comprising the steps of:

mixing an aqueous solution of amines having a boiling point of 300° C. or lower as measured under an ambient pressure with a titanium source to produce a layered titanate;

applying a solution containing an organic cation derived from amines having a boiling point of 300° C. or lower as measured under an ambient pressure, and said layered titanate onto a substrate; and heat-treating the thus applied solution at a temperature from 80 to 250° C.

5. The process for producing a transparent coating film according to claim 4, wherein the amines are alkyl amines and/or alkenyl amines.

6. The process for producing a transparent coating film according to claim 4, wherein the amines are secondary alkyl amines having 1 to 10 carbon atoms.

7. The process for producing a transparent coating film according to claim 4, wherein the amine is diethylamine.

* * * * *